United States Patent [19]
Harfmann

[11] Patent Number: 6,130,261
[45] Date of Patent: *Oct. 10, 2000

[54] METHOD OF RECYCLING POLYESTER FOAM

[75] Inventor: Walter Rudolf Harfmann, Matthews, N.C.

[73] Assignee: Genpak, L.L.C., Glens Falls, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/859,202

[22] Filed: May 20, 1997

[51] Int. Cl.⁷ .................................................. C08J 11/04
[52] U.S. Cl. ............................... 521/48; 156/84; 156/99; 264/37; 264/321; 264/322; 264/342 R; 264/DIG. 71
[58] Field of Search ........................... 156/84, 94; 264/37, 264/321, 322, 342 R, DIG. 71; 521/48

[56] References Cited

U.S. PATENT DOCUMENTS

| | | |
|---|---|---|
| 3,607,999 | 9/1971 | Corbett et al. . |
| 3,746,610 | 7/1973 | Hoegger . |
| 4,417,932 | 11/1983 | Breitscheidel et al. . |
| 5,258,085 | 11/1993 | Breitscheidel et al. . |
| 5,286,321 | 2/1994 | Fuss . |
| 5,695,133 | 12/1997 | Morse, Jr. et al. . |

FOREIGN PATENT DOCUMENTS

678184 A5  8/1991  Switzerland .

OTHER PUBLICATIONS

"The World's Largest designer and manufacturer of pellet mills and pelleting equipment," California Pellet Mill Co., Crawfordsville, IN (1993).

*Primary Examiner*—John M. Cooney, Jr.
*Attorney, Agent, or Firm*—Heslin & Rothenberg, P.C.; Wayne F. Reinke, Esq.

[57] ABSTRACT

PET foam is processed into flakes. The flakes are densified in a pellet mill at between about 300° F. and about 350° F. to produce pellets. The pellets are then dried in a desiccant dryer at about 350° F. for about 6 hours, so that the dew point of the pellets reaches about −40° F. The dried pellets have an intrinsic viscosity about equal to virgin PET and a crystallinity greater than 20%. This material can be reused as if it were virgin PET.

17 Claims, 4 Drawing Sheets

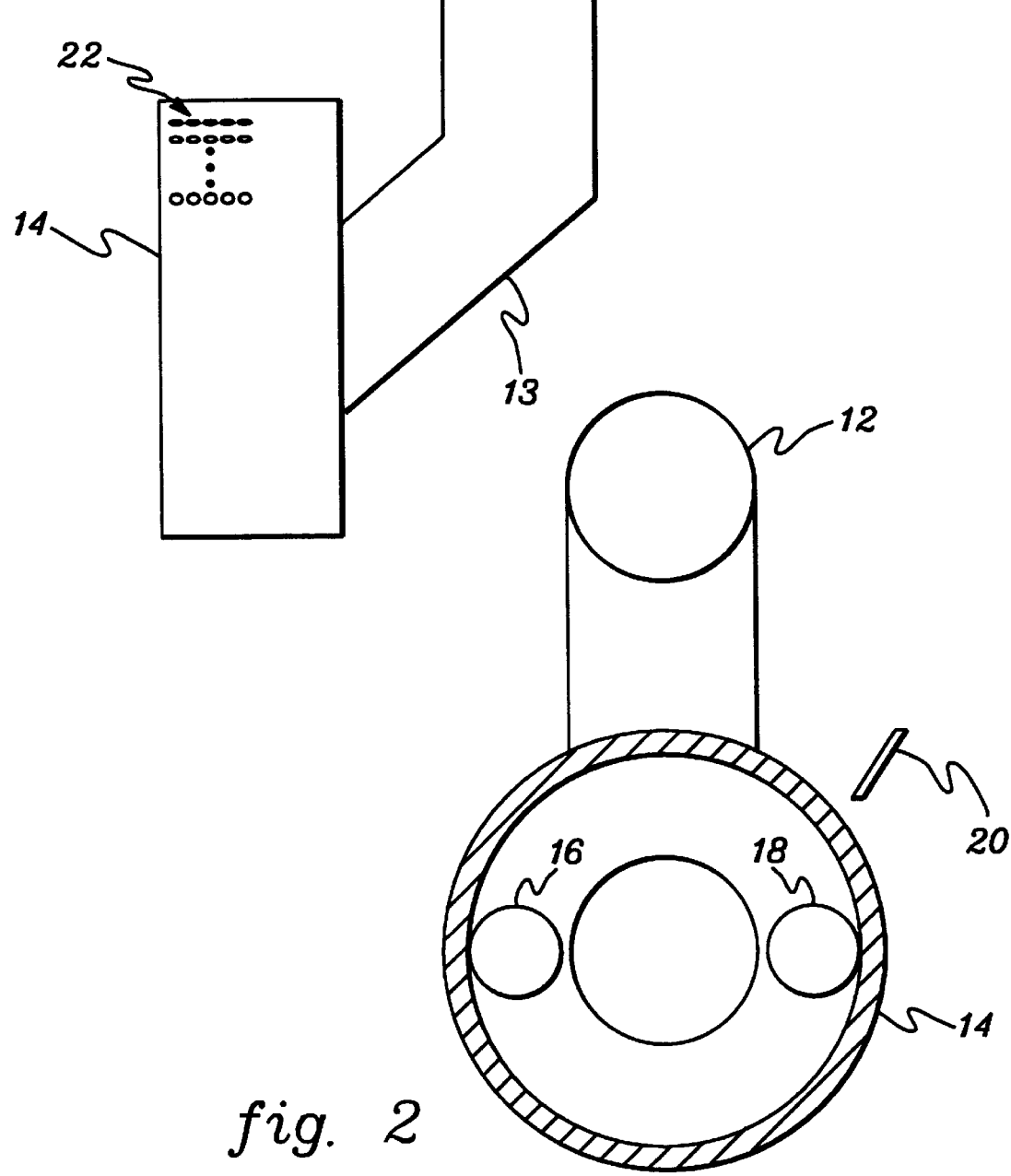

METHOD OF RECYCLING POLYESTER FOAM

BACKGROUND OF THE INVENTION

TECHNICAL FIELD

The present invention generally relates to recycling. More particularly, the present invention relates to a method of recycling foamed polyester.

BACKGROUND INFORMATION

In the past, low density polystyrene foam has been found useful in insulation, packaging, beverage cups and food containers. However, polystyrene foam and the extrusion process for making it have been associated with undesirable environmental concerns, regardless of whether those concerns have their origin in fact. In addition, polystyrene products generally have a service temperature limit of about 200° F. Above the service temperature limit, the product will warp and distort. Therefore, there is a general desire for other types of low density foam that are not associated with such concerns. Polyester resins, such as PET (poly(ethylene terephthalate)), exist that could be used without such associated concerns. PET is currently widely used to make many recyclable plastic items, such as soda bottles.

In the production of polyester foam articles, such as, for example, food service containers, the first step is typically to produce a polyester foam sheet, e.g., by extrusion. This sheet is then thermoformed into the desired article. In doing so, the excess material around the parts (the "skeleton"), scrap sheet and scrap parts are reprocessed and fed back into the extrusion process so that no raw materials are lost.

Early attempts to incorporate the polystyrene foam scrap directly back into the sheet extrusion process had very limited success. Due to the very low bulk density of the scrap, the extruder had to be either very large relative to throughput, or run at very high speeds. Both scenarios resulted in high shear rates leading to excessive polymer degradation and unstable process conditions. This direct incorporation approach, if taken with PET foam regrind, would be fatal. The high shear rates would so degrade the polymer that the intrinsic viscosity would no longer be sufficient to support foam production.

To solve the problem in conventional foam processes, a separate repelletization line has been incorporated into the overall process. The repelletization line is designed to produce a pellet of high density from scrap, and operates at relatively low throughputs and low shear rates to minimize product degradation. Unfortunately, this operation is not well suited to polyester foam regrind. Polyester is generally more shear sensitive than other foam polymers, such as, for example, polystyrene. However, the greater challenge is drying the regrind before processing. In PET processing, for example, the polymer must be dried to a dew point of about −40° F. Even small amounts of water cause excessive degradation. The problem is that with the low bulk density of the regrind, the size of the dryer becomes cost prohibitive and in fact is so large that it is difficult to ensure even drying and/or even flow through the dryer.

Thus, a need exists for an improved method of recycling polyester foam.

SUMMARY OF THE INVENTION

Briefly, the present invention satisfies the need for an improved method of recycling polyester foam by increasing the density of the foam, e.g., by mechanically compressing it. The increased density is accompanied by a molecular surface area greater than that of equal weight unfoamed polyester. The increased surface area results in a significant increase in intrinsic viscosity during subsequent drying, prior to re-use in sheet manufacture.

In accordance with the above, it is an object of the present invention to provide a method of recycling polyester foam.

It is another object of the present invention to provide a method of recycling polyester foam that requires little or no drying time of the foam before densifying.

It is still another object of the present invention to provide a method of recycling polyester foam that increases the intrinsic viscosity of the polyester foam.

The present invention provides a method of recycling polyester foam. The method comprises steps of densifying a given type of polyester foam such that when in densified form, the polyester foam has a molecular surface area greater than that of equal weight unfoamed polyester of the given type; and drying the densified polyester foam such that the intrinsic viscosity thereof increases.

These, and other objects, features and advantages of this invention will become apparent from the following detailed description of the various aspects of the invention taken in conjunction with the accompanying drawings.

BRIEF DESCRIPTION OF THE DRAWINGS

FIG. 1 is a simplified diagram of a pellet mill useful with the present invention.

FIG. 2 is a partial cross-section view of the pellet mill of FIG. 1.

BEST MODE FOR CARRYING OUT THE INVENTION

Figure 3:
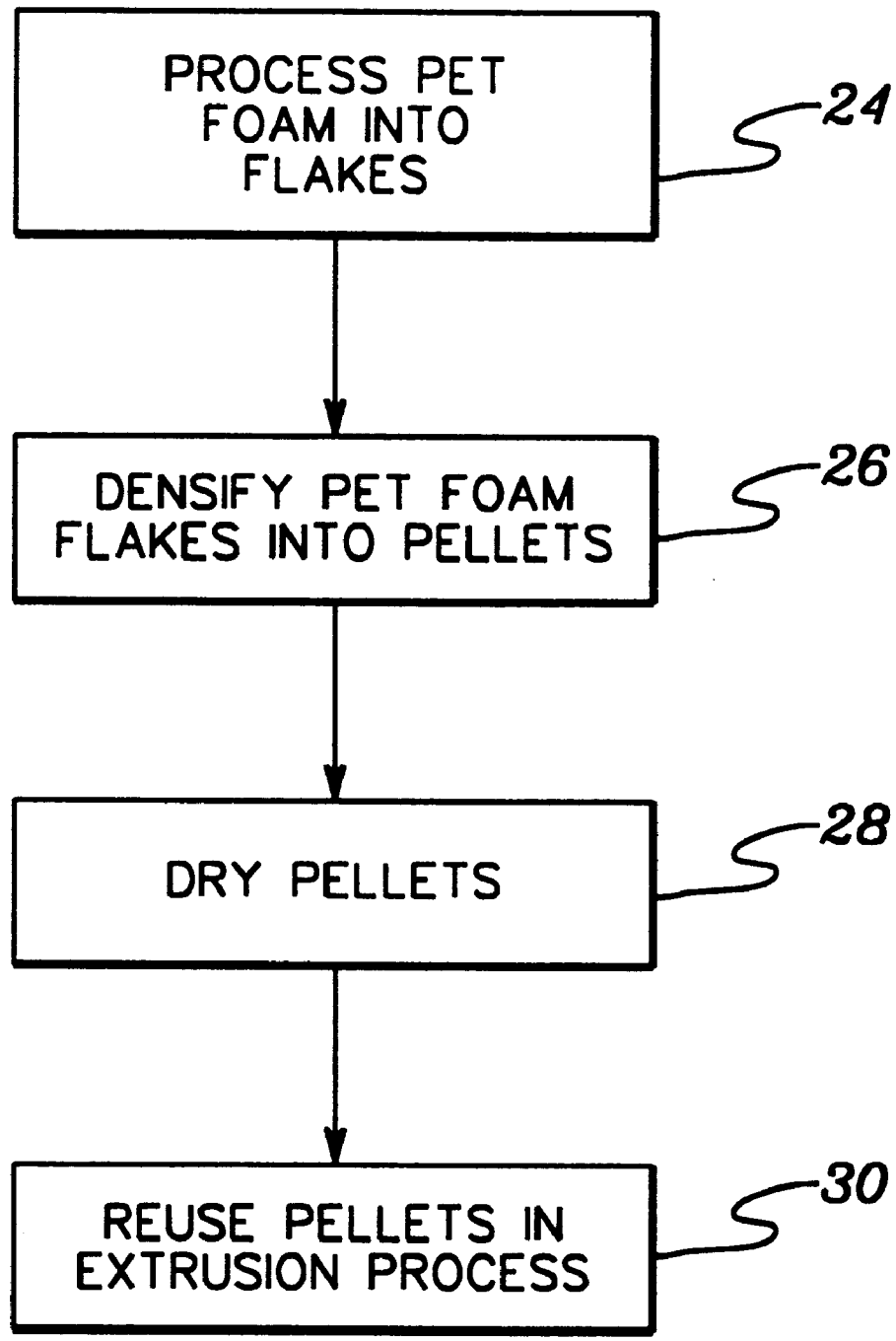
FIG. 3 is a block diagram of the recycling process of the present invention.

FIG. 1 is a simplified diagram of a pellet mill 10 useful with the present invention. Such pellet mills are commercially available in many shapes and sizes from various companies. Pelletizing machines are used for a number of different purposes, such as, for example, to produce animal feed and to produce coal pellets from coal dust. Pellet mills have also been used in the carpet industry to press polyester fibers together without destroying them.

Pellet mill 10 includes an infeed conveyor 12, chute 13, die 14, rollers 16 and 18, and sizing knife 20. The pellet mill used in conjunction with experiments for the present invention had a die with ⅛ inch diameter holes by 1.5 inches deep. However, it will be understood that other pellet mills, as well as other types of densifying machines could be used. However, the densifying machine used is preferably able to densify the polyester foam without melting it, such that the densified polyester foam has a molecular surface area greater than that of equal weight unfoamed polyester (e.g., virgin polyester). The polyester foam used was scrap PET foam from a thermoforming process, however, it will be appreciated that other types of polyester foam could be used, and the foam need not be scrap. The foam to be recycled could also be, for example, used polyester foam containers that have been suitably cleaned or imperfect polyester foam containers rejected during manufacturing. A general description of the basic operation of pellet mill 10 will now be given.

Infeed conveyor 12 transports ground material (in this case, foam) to a chute 13. In the chute, gravity causes the material to fall into the mill interior. Die 14 compresses the material by the rotation of rollers 16 and 18. That is, the die 14 rotates about its axis as the rollers 16 and 18 rotate about their axes. No other motion occurs. This action forces the material into holes 22 in the die. Sizing knife 20 is used to cut the compressed material that is forced out, forming pellets.

Prior to the pelletizing investigation, it was expected that the density of the PET foam would increase, at the expense of some intrinsic viscosity. As one skilled in the art will know, "intrinsic viscosity" refers to an indirect measurement of molecular weight. However, the investigation revealed that no loss in intrinsic viscosity was realized due to densification. More surprising was the result that, when the densified PET foam was dried, the intrinsic viscosity increased dramatically.

It has been the experience of various PET manufacturers that while typical PET resins are incapable of forming a stable foam structure, high molecular weight PET, typified by higher intrinsic viscosities, can produce stable medium and low density foam products. In the manufacture of PET, it is known that intrinsic viscosity can be increased by a process known as "solid stating." In the solid stating process, virgin PET pellets are held at temperatures of about 400° F. for a period of about 24 hours. Trace amounts of unreacted sites in the PET undergo reaction, yielding an increase in intrinsic viscosity from values of, for example, about 0.7 to 0.8 dl/g to about 1.1 to 1.3 dl/g. Solid stating is a slow process and accounts for the extra cost of producing high intrinsic viscosity polyester. A drawback to the solid stating process is that an increased intrinsic viscosity is related to particle surface area, which is relatively small for commonly available solid PET pellets.

As will be shown from the example data below, the bulk density of the PET foam scrap was increased from typical values of between about 6 to 10 lb/ft$^3$ to values of between about 30 to 40 lb/ft$^3$. The intrinsic viscosity of the scrap PET foam was between about 0.8 to 0.85 dl/g, with the densified PET foam showing no loss in intrinsic viscosity. When the PET pellets were dried in a desiccant dryer at 350° F., the intrinsic viscosity increased to about 1.2 dl/g within only six hours time. As one skilled in the art will know, a "desiccant dryer" removes moisture, allowing the material to be dried to a dew point of –40° F. or less.

A detailed description of the preferred embodiment of the present invention will now be given with reference to the block diagram of FIG. 3. The following description will be given with respect to scrap PET foam, and using a pellet mill, such as that in FIG. 1. However, it will be appreciated that other types of polyester foam could be used, though mixing different types is not preferred, and other densifying machines could be used.

The scrap PET foam is first processed into flakes, by, for example, using a sheet grinder. Step 24, "PROCESS PET FOAM INTO FLAKES." At this point the flakes could be stored until needed. The PET foam flakes are then densified into pellets, for example, by using the pellet mill 10 of FIG. 1. While the densification of PET foam can take place at temperatures of between about 200° F. and about 400° F., greater densities with better cohesion of the pellets is achieved at temperatures of between about 275° F. and about 375° F., and preferably between about 300° F. and about 350° F. In any case, the densification must take place at a temperature below the melting point of the polyester foam used. Step 26, "DENSIFY PET FOAM FLAKES INTO PELLETS." At this point, the pellets could be classified by size, and undersized particles (called "fines") can be removed and run back through the densifying process again such that no material is lost. One way to densify is to compress the flakes, preferably to a bulk density of greater than about 0.3 g/cm$^3$, and most preferably greater than about 0.5 g/cm$^3$. The PET foam pellets are then dried, preferably in a desiccant dryer, at less than about 375° F. and preferably about 350° F., for less than about 6 hours and preferably about 4 hours, so that the dew point of the pellets reaches about –40° F. After drying, the pellets preferably have an intrinsic viscosity of greater than about 0.95 g/dl. Step 28, "DRY PELLETS." Optionally, the dried pellets may then be reused in a thermoforming process, such as, for example, an extrusion process. Step 30, "REUSE PELLETS IN EXTRUSION PROCESS."

Figure 4:
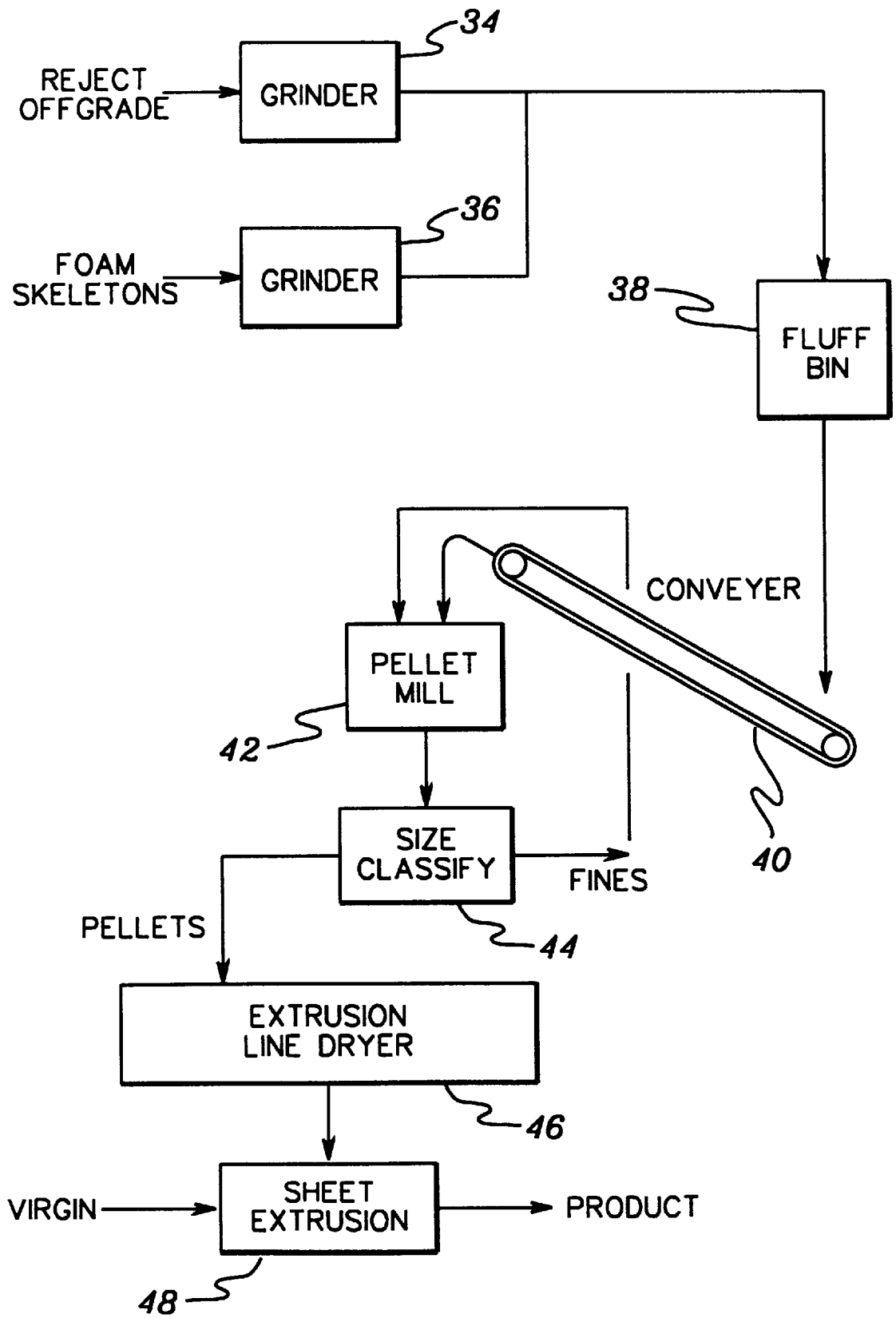
FIG. 4 is a block diagram of a production line incorporating the present invention.

FIG. 4 is a block diagram of an exemplary manufacturing line 32 that the present invention is incorporated into. Grinders 34 and 36 are sheet grinders used to turn reject or off-grade parts (grinder 34) and scrap foam sheet or skeletons (grinder 36) into foam flakes. The flakes are then transferred to a fluff bin 38. The flakes are then sent via conveyer belt 40 to pellet mill 42 for pelletization. The pellets produced are then sorted by a size classifier 44 according to size, and dried by desiccant dryer 46. After drying, the pellets are ready to be used in, for example, an extrusion process using extruder machinery 48.

Example data will now be presented. Although specific polyester resins are noted, it will be understood that other polyester resins could be used with the present invention.

EXAMPLE 1

Foam sheet was produced using Shell "TRAYTUF 2928" polyester resin with a hydrocarbon blowing agent. The sheet was ground into a flake form and pelletized by the process disclosed, using a California Pellet Mill with a 12" diameter die. The die had holes of 1/8" diameter and was 1.5" thick. The temperature of the die during the pelletization operation ranged from 320° F. to 340° F. The pellets were subsequently dried at 350° F. for six hours. The following data was collected:

|  | I.V. (dl/g) | Crystallinity (%) | Density (g/cm$^3$, bulk) |
| --- | --- | --- | --- |
| Foam Flake | 0.834 | 11.0 | Approx. 0.12 |
| Pellets | 0.828 | 30.6 | Approx. 0.61 |
| Pellets (after drying) | 1.16 | | |
| Virgin Resin | 1.20 (typical) | | 0.7 (typical) |

In this example, the pellets produced had a bulk density nearly that of virgin resin and required no additional density increase for subsequent processing into foam sheet. The I.V. (intrinsic viscosity) of the pellets produced (before drying) was within experimental error of being identical to the I.V. of the flake before processing. In addition, the crystallinity of the pellets was 30.6%, showing a dramatic increase over the flake and therefore eliminating the further need to re-crystallize the pellets before drying. The drying operation yielded an increase in I.V. of over 0.3 dl/g, which is not expected with solid pellets dried for this duration at the stated temperature. The repel (i.e., repelletized polyester foam) produced was further processed back into foam sheet without any apparent negative product affects.

EXAMPLE 2

Foam sheet was produced using Shell "TRAYTUF 2928" polyester with a hydrocarbon blowing agent. The sheet was ground into a flake form and pelletized by the process disclosed, using a California Pellet Mill with a 16" diameter die. The die had holes of 1/8" diameter and was 1.5" thick. The temperature of the die during the pelletization operation ranged from 240° F. to 270° F.

|  | I.V. (dl/g) | Crystallinity (%) | Density (g/cm$^3$, bulk) |
| --- | --- | --- | --- |
| Foam Flake | 0.894 | 9.7 | Approx. 0.12 |
| Pellets | 0.900 | 29.2 | Approx. 0.32 |
| Foam Sheet (100% Virgin) | 0.898 |  |  |
| Foam Sheet (50% Repel) | 0.875 |  |  |

This example again illustrates the increase in crystallinity achieved by the method of pelletizing and again shows that the I.V. of the pellets was, in essence, identical to the starting foam flakes. In this example, a lower operating temperature yielded less density increase, but the pellets could still be adequately extruded without adverse process affects. In addition, the I.V. of the final sheet, produced from 48% repelletized polyester, was compared to sheet produced from 96% virgin resin (the balance being blowing agent and nucleant). The results indicate that the I.V. of both materials to again be identical, that is, the repelletized polyester showed no deterioration in performance due to previous processing history.

EXAMPLE 3

Polyester foam flake was dried using a desiccant dryer and processed on a twin screw extruder at a melt temperature of approximately 520° F. The following data was collected:

|  | I.V. (dl/g) | Crystallinity (%) | Density (g/cm$^3$, bulk) |
| --- | --- | --- | --- |
| Foam Flake | 0.834 | 11.0 | Approx. 0.12 |
| Pellets | 0.738 |  | Approx. 0.7 |

Although the density by this method increased to the value of virgin resin, a substantial drop in I.V. was observed. Although I.V. was not measured after subsequent drying, the material would not support stable foam formation and collapse was observed when extruded with 50% virgin polyester resin. This example is used to illustrate the failure of conventional technology to produce a usable pellet from foam flakes.

It can be seen from the above that the present inventive method increased the intrinsic viscosity of the PET pellets much faster and at lower temperatures than solid stating. A plausible explanation for this phenomenon is that although the scrap PET foam (after flaking) was compressed to a high bulk density, the individual flakes, while their cell structure was destroyed, still existed. As a result, the pellets at a molecular level have a very large surface area. This large surface area allows the intrinsic viscosity to rapidly increase at a relatively low temperature. The practical value of this phenomenon is that the intrinsic viscosity of the scrap PET foam can be increased to that of virgin PET resin using the normal drying process. No additional equipment or processing is required and the final product will not deteriorate in performance due to degradation of the scrap or the amount incorporated. An additional benefit is that the material exiting the pellet mill was found to be crystallized, whether or not the material fed to the pellet mill was crystallized. This eliminates the need to crystallize before drying.

Figure 5:
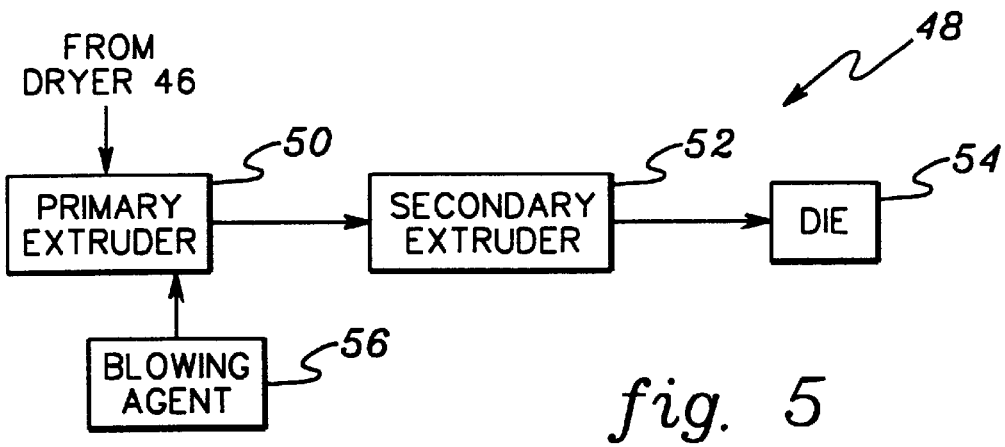
FIG. 5 is a block diagram of extrusion equipment useful in the production line of FIG. 3.
Figure 6:
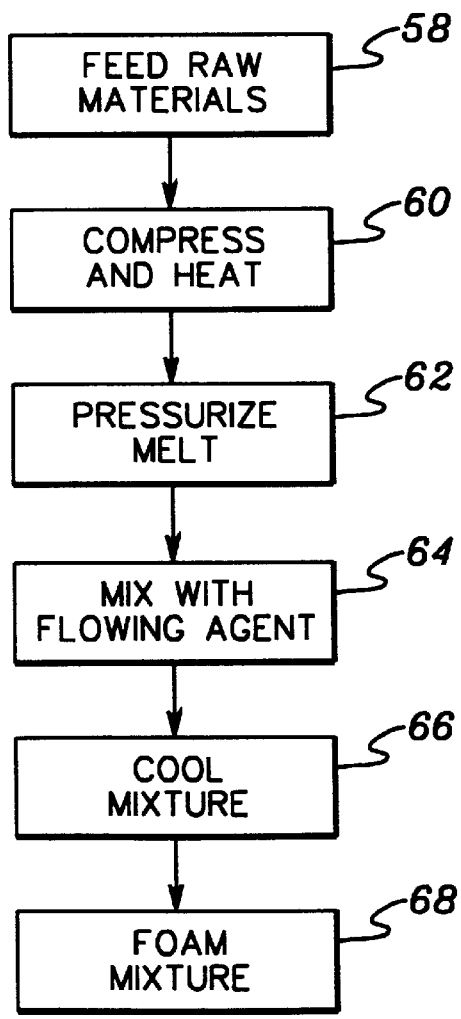
FIG. 6 is a flow diagram for the operation of the extrusion equipment of FIG. 5.

With reference to FIGS. 5 and 6, a general tandem extrusion process will now be described that is useful with the present invention. It will be understood, however, that other extrusion processes exist that could also be used, and this is merely one example given in order to put the invention in context.

FIG. 5 is a block diagram of the major portions of extrusion machinery 48 used in a tandem extrusion process beyond dryer 46 in FIG. 4. The major portions include a primary extruder 50, secondary extruder 52 and die 54. One of ordinary skill in the art will understand the operation of the major portions. Generally, melting of the solids from dryer 46 to be extruded (a polymer) and mixing with the blowing agent 56 are accomplished in primary extruder 50. Cooling of the mixture is performed in secondary extruder 52. Finally, the cooled mixture is fed to die 54 for foaming.

FIG. 6 is a flow diagram for the extrusion process of FIG. 5. The dried raw materials, including any additives, are first fed to primary extruder 50 (STEP 58, "FEED RAW MATERIALS"). The raw materials will generally comprise a mixture of virgin polymer, reclaim polymer generated in manufacturing, colorants, stabilizers, nucleators, flame retardants, plasticisers, and possibly other additives. Although ratios of the additives may vary greatly, generally the virgin polymer and reclaim polymer constitute about 90% or more of the solid feed by weight. The raw materials may be fed to primary extruder 50 by volumetric or gravimetric feeders and may or may not use a blender to homogenize the mixture before being fed. Often, the primary extruder is flood fed; that is, there is a constant supply of raw material directly on the extruder inlet or feed throat, although other types of feeding are practiced.

After the raw materials are fed to primary extruder 50, they are compressed and heated to melt them (STEP 60, "COMPRESS AND HEAT"). After melting the raw materials, the melt is pressurized (STEP 62, "PRESSURIZE MELT"). Typical pressures range from about 150 atm to about 350 atm. After pressurizing the melt, a blowing agent or agents (e.g., hydrocarbons, halohydrocarbons and/or inert gases) is injected into primary extruder 50. The pressure may temporarily be reduced to aid in the injection. The melted raw materials and blowing agent are then mixed to create a homogeneous mixture prior to exiting primary extruder 50 (STEP 64, "MIX WITH BLOWING AGENT"). The mixing can be distributive or dispersive, depending on the solubility of the selected blowing agent.

After injecting the blowing agent and combining with the melted raw materials, the mixture is generally too hot to foam. When the mixture is too hot, viscosity is low, and if foaming were attempted, the blowing agent would expand the cells within the foam too rapidly, leading to cell wall rupture and foam collapse. If, on the other hand, the mixture were too cold, the blowing agent would have insufficient potential energy to expand the mixture into a foam. Precise control of the foaming temperature is thus needed to ensure good quality foam.

Cooling of the mixture is accomplished in secondary extruder 52 (STEP 66, "COOL MIXTURE"). The secondary extruder is usually larger than the primary extruder to maximize the amount of surface area for heat transfer. Shear heating of the mixture is minimized through various designs for the secondary extruder screw, which provides continuous surface renewal. Without this renewal, the mixture at the surface of the extruder barrel would freeze and insulate the rest of the mass, which would pass through the secondary extruder without being cooled. Usually, the extruder barrel in the secondary extruder operates at much lower revolutions than that of the primary extruder, to reduce shear heating. The particular screw design used may affect the pressure of the mixture.

The cooled mixture is then delivered to die 54 for foaming (STEP 68, "FOAM MIXTURE"). The principle purpose of the die is to shape the polymer into a form, while maintaining the pressure to ensure that the blowing agent does not separate from the mixture prematurely. Ideally, the blowing agent remains in the mixture until exiting the die. The design of the die determines the shape/thickness of the extruded foam. After the foam is extruded, any number of finishing equipment technologies may be used to produce the final product.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

What is claimed is:

1. A method of recycling polyester foam, comprising steps of:
   densifying polyester foam such that when in densified form, the polyester foam has a surface area greater than that of equal weight densified unfoamed solid polyester; and
   mechanically drying the densified polyester foam such that the intrinsic viscosity thereof increases such that stable foam from the dried densified polyester foam is obtainable in a subsequent polyester foam formation process.

2. The method of claim 1 further comprising, prior to the step of densifying, the step of processing the polyester foam to create a plurality of polyester foam flakes.

3. The method of claim 2, wherein the plurality of polyester foam flakes and the densified polyester foam have about the same intrinsic viscosity.

4. The method of claim 2, wherein the step of densifying comprises densifying the plurality of polyester foam flakes at a temperature of between about 200° F. and about 400° F.

5. The method of claim 4, wherein the temperature is between about 275° F. and about 375° F.

6. The method of claim 5, wherein the temperature is between about 300° F. and about 350° F.

7. The method of claim 2, wherein the step of densifying comprises compressing the plurality of polyester foam flakes into a plurality of pellets, and wherein the step of drying comprises drying the plurality of pellets.

8. The method of claim 7, wherein the step of mechanically drying comprises mechanically drying the plurality of pellets to a dew point of about −40° F.

9. The method of claim 8, wherein the step of mechanically drying comprises mechanically drying the plurality of pellets at a temperature of less than about 375° F. for less than about 6 hours.

10. The method of claim 9, wherein the step of mechanically drying comprises drying the plurality of pellets in a desiccant dryer.

11. The method of claim 9, wherein the temperature is about 350° F.

12. The method of claim 1 further comprising the step of extruding polyester foam sheet from the dried densified polyester foam, whereby the polyester foam is recycled.

13. The method of claim 1, wherein the step of densifying comprises compressing the polyester foam to a bulk density greater than about 0.3 g/cm³.

14. The method of claims 13, wherein the bulk density is greater than about 0.5 g/cm³.

15. The method of claim 1, wherein the polyester foam comprises PET, wherein the step of densifying comprises densifying the PET, and wherein the step of mechanically drying comprises mechanically drying the densified PET.

16. The method of claim 1, wherein the densified polyester foam has a crystallinity of at least 20%.

17. The method of claim 1, wherein the dried densified polyester foam has an intrinsic viscosity of greater than 0.95 g/dl.

* * * * *